United States Patent [19]
Holt

[11] 3,823,505

[45] July 16, 1974

[54] SAFETY CATCH FOR TRAP

[75] Inventor: Ronald A. Holt, Lawrence, Kans.

[73] Assignees: Chali A. Holt; Joan B. Holt; Ivan. N. Holt, all of Lawrence, Kans.; part interest to each

[22] Filed: Feb. 5, 1973

[21] Appl. No.: 329,888

[52] U.S. Cl. .............................................. 43/81.5
[51] Int. Cl. .......................................... A01m 23/30
[58] Field of Search ..................................... 43/81.5

[56] References Cited
UNITED STATES PATENTS

| 1,472,217 | 10/1923 | Gufler | 43/81.5 |
| 1,472,666 | 10/1923 | Munroe | 43/81.5 |
| 1,726,127 | 8/1929 | Seghers | 43/81.5 |

FOREIGN PATENTS OR APPLICATIONS

| 498,190 | 1/1939 | Great Britain | 43/81.5 |
| 590,397 | 7/1947 | Great Britain | 43/81.5 |

Primary Examiner—Louis G. Mancene
Assistant Examiner—J. Q. Lever
Attorney, Agent, or Firm—Schmidt, Johnson, Hovey & Williams

[57] ABSTRACT

A safety catch for a conventional mousetrap or the like in which a spring-loaded jaw is maintained in an open position by a shiftable latch engageable with the jaw and a bait-holding treadle. The catch is mounted on the base and is selectively shiftable for movement into and out of contact with the latch and includes a notch for receiving and seating the latch when the catch is in contact therewith. The safety catch is so positioned relative to the latch that the latter is clamped and stabilized in a fixed, inoperative condition relative to the treadle as long as the catch is in contact with the latch, the same being held against movement in both vertical and horizontal planes.

5 Claims, 9 Drawing Figures

PATENTED JUL 16 1974 3,823,505

SAFETY CATCH FOR TRAP

This invention relates to a safety catch for use with a mousetrap or the like to permit presetting of the trap prior to actual placement at a point of use. An undesirable aspect of making use of a trap of this nature is the somewhat hazardous and, therefore, unpleasant task of placing the spring-loaded jaw in a cocked, open position after having baited the trap. The sensitive nature of the latching components make them especially vulnerable to premature release as the trap is being placed with the possibility of not only startling the user, but also including the possibility of inflicting injury by virtue of the spring-loaded jaw striking a finger or other parts of the hand.

It is, therefore, a very important object of this invention to provide a safety catch for a mouse trap or the like which permits the trap to be fully prepared for use at the factory and packaged for shipment and sale to the ultimate consumer in such a manner that the only preparation needed to place the trap into use is to release the safety catch from the contact with a jaw-retaining latch, at which time the trap will be fully operational.

Yet another important object of my invention is the provision of a safety catch for a trap in which release of the latch component of the trap is restricted rather than the jaw of the trap, thus serving to maintain the trap in a fully set condition at all times rather than merely retain the spring-loaded jaw in its open condition with the possibility of having to reset the latch which might have become dislodged.

A still further object of my invention is to provide a safety catch for a trap in which the latch of the trap is clamped in a fixed position and stabilized both vertically and horizontally, thus placing it in an inoperative condition relative to the bait-holding and latch-activating treadle.

Another object of my invention is to provide a reliable safety catch for a trap which is simply constructed and economical in cost.

Figure 1:
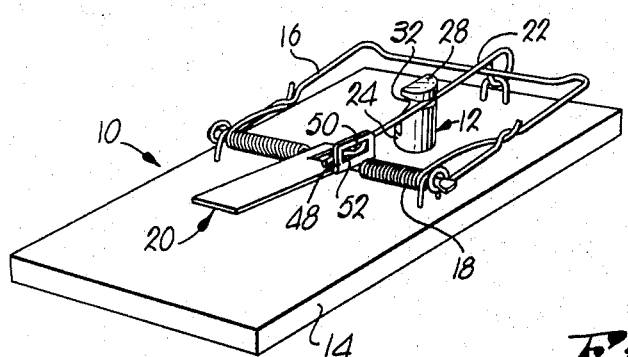
FIG. 1 is a perspective view of a conventional mouse trap of ordinary construction and having a safety catch made pursuant to the present invention, the catch being positioned in a manner to place the latch in an inoperative condition.
Figure 2:
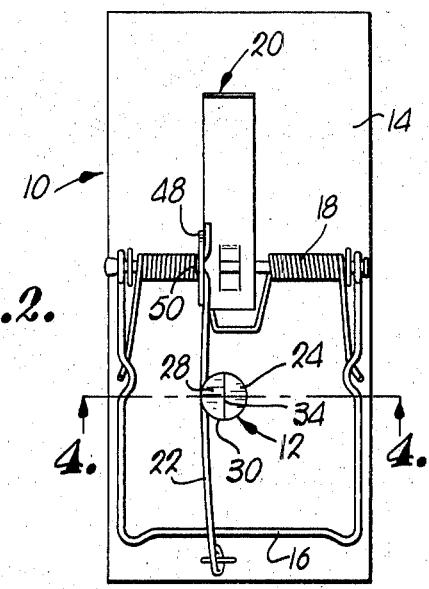
FIG. 2 is a plan view of the trap again illustrating the safety catch in position to place the latch in an inoperative condition.

Referring initially to FIGS. 1–5, a conventional mousetrap 10 or the like is provided with a safety catch 12. The trap 10 is of the kind having a rectangular base 14, a spring-loaded jaw 16 swingable about a transverse, horizontal axis from an open position to a closed position in response to the action of a coil spring 18, a pivotable bait-retaining treadle 20, and an elongated, shiftable latch 22 engageable with the jaw 16 and the treadle 20 in a manner to releasably maintain the jaw 16 in an open position against the action of the spring 18, as best seen in FIGS. 1 and 2, and adapted to release the jaw 16 for swinging to a closed position when the treadle 20 is caused to be pivoted.

Figure 4:
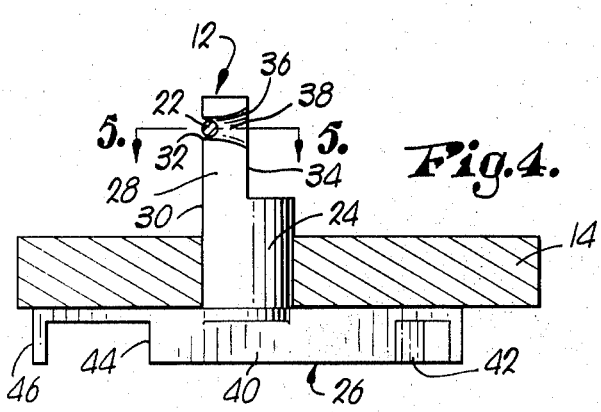
FIG. 4 is an enlarged, vertical, cross-sectional view taken along line 4—4 of FIG. 2.

The catch 12 is in the form of a selectively shiftable member mounted on the base 14 for movement into and out of contact with the wire-like latch 22. The member 12 presents an upright, elongated shaft 24 which extends through the base 14 and includes a horizontally disposed handle 26 located beneath the base for selectively rotating the member 12 about an upright axis from a locked, latch-contacting position as best seen in FIG. 4 to an unlocked position (not shown) in which the member 12 is in a laterally spaced relationship to the latch 22.

A half-cylindrical, elongated, upper extension 28 forms a part of the member 12 and is offset from the central axis of rotation thereof and presents a semicircular, transverse cross-section having an arcuate, vertical surface 30 concentric with the axis of rotation. Spaced downwardly from the upper free end of the extension 28 is a horizontal, channel-like notch 32 disposed in the arcuate surface 30 and in a horizontal plane common to the latch 22. The extension 28 further presents a planar, upright wall 34 opposite the arcuate surface 30; the terminal ends of the notch 32 presenting flared portions 36 at the junctures of the surface 30 with the wall 34. It is to be further noted that the notch 32 is of a greater depth at the flared portion 36 such that the section of the extension 28 interiorly of the notch 32 defines a cam body 38 engageable with the latch 22, this best being seen in FIG. 5.

Figure 3:
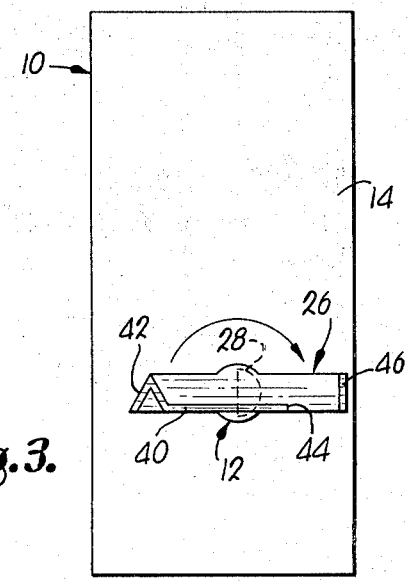
FIG. 3 is a bottom view illustrating handle means for shifting the catch into and out of contact with the trap latch.

The transverse handle 26 includes a normally downwardly depending flange 40 formed to serve as an indicator 42 to show in which direction the member should be rotated to remove the extension 28 from contact with the latch 22 as indicated by the arrow in FIG. 3. A gap 44 between the flange 40 and an endpiece 46 of the handle 26 permits the use of an adhesive-treated tape or similar material to hold the member 12 in its latch-contacting position until such time as it is desired to release the latch for placing the trap 10 in use.

In use, the jaw 16 is placed in its open position against the return action of the spring 18, as seen in FIGS. 1 and 2, after which the latch 22 is placed in overlying relationship to the jaw 16 and into engagement with an upright abutment 48 of the treadle 20. A formed elbow 50 adjacent the free end of the latch 22 is received in a corresponding slot 52 in the abutment 48 to complete the setting of the trap. As the elbow 50 is placed in the slot 52, the member 12 is rotated by means of the handle 26 to bring the extension 28 into contact with the latch 22 and, in so doing, seat the latter in the notch 32, the leading flared portion 36 and the cam 38 cooperating to not only guide the latch 22 into the notch 32 but also forcing the elbow end of the latch 22 in the direction of the abutment 48 to firmly bias the latch 22 thereagainst, thereby clamping and stabilizing the latch 22 in a fixed, inoperative condition relative to the treadle 20. With the latch 22 thus safely clamped, any accidental or inadvertent pivotal force exerted on the treadle 20 will not cause the elbow 50 to become dislodged from the slot 52 with the consequential release of the jaw 16 to its closed position.

Figures 5, 6:
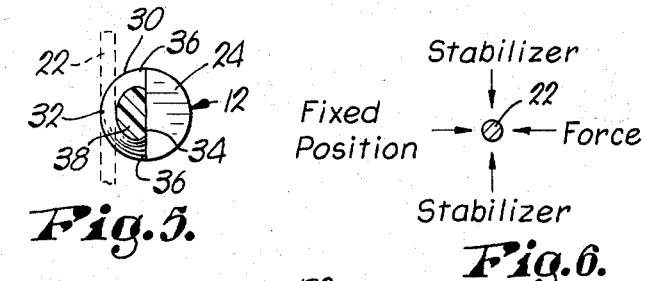
FIG. 5 is an enlarged, cross-sectional view of the safety catch taken along line 5—5 of FIG. 4.
FIG. 6 is a schematic illustration showing the force lines imposed on the trap latch when the safety catch is in contact therewith.

Reference to FIG. 6 will clearly illustrate the manner in which the latch 22 is held in such a fixed condition with the arrow labeled "fixed position" representing the abutment 48, and the arrow labeled "force" representing the action of the member 12 with the cam body 38 urging the latch 22 in the direction of the abutment 48, the two arrows identified "stabilizer" representing the vertical movement limitations imposed by the notch 32. At the time of use it is but a simple matter for the handle 26 to be rotated in the direction as indicated by the indicator 42 to remove the extension 28 from contact with the latch 22 so that the wall 34 is facing the latch 22 in spaced relationship thereto, the trailing flared portion 36 serving to gently release the latch from the notch 32 to avoid premature release of the jaw 16.

It is to be particularly noted that clamping of the latch 22 not only safely holds the jaw 16 in its open position but also insures that the latch is not dislodged from its jaw-retaining position thus precluding the need for "resetting" the latch relative to the treadle 20 when the trap is placed in use. In other words, if the catch were disposed to only hold the jaw, the latch could easily be removed from engagement with the treadle through jarring, dropping, or other rough handling. All components are thus maintained in their fully operational condition.

Figure 7:
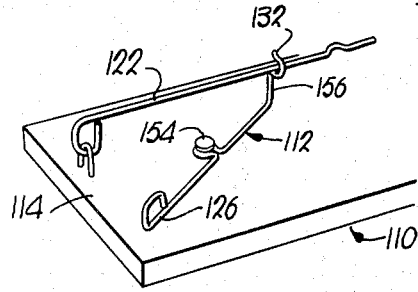
FIG. 7 is a fragmentary, perspective view of an alternate form of the safety catch.

An alternate form of the invention is shown in FIG. 7 wherein a safety catch for a trap 110 is presented in the form of an elongated wire 112 shiftably mounted on a base 114 for horizontal movement about a vertical axis defined by a pin or shaft 154. The elongated wire member 112 is provided with an upright stretch 156 at one end thereof which is formed into a notch 132 disposed on a common horizontal plane with a latch 122. A push handle 126 is formed at the opposite end of the member 112 for use in shifting the latter into and out of contact with the latch 122. The remaining operation of this particular modification of the safety catch will be self-evident from the initial description of the invention.

Figure 8:
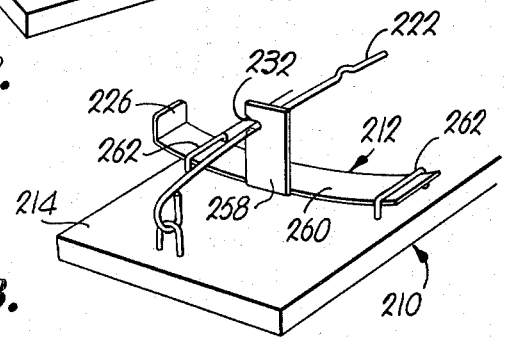
FIG. 8 is a fragmentary, perspective view of yet another alternate form of the safety catch.
Figure 9:
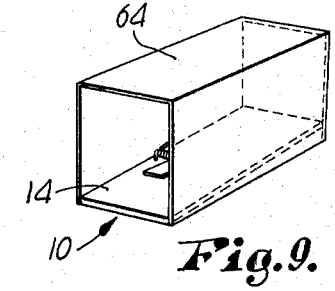
FIG. 9 is a slightly reduced perspective view illustrating an optional shroud for the trap.

Referring to FIG. 8, there is shown yet another form of the invention in which a trap 210 is provided with a slidable, reciprocable member 212 in the form of a horizontally disposed bracket provided with an upright arm 258 having a notch 232 in a lateral direction. The member 212 further includes an elongated, horizontally disposed, longitudinally arcuate slide 260 held in frictional engagement with a base 214 of the trap by a pair of saddle-type holding means 262 such as staples. One end of the slide 260 is formed to provide a push-pull lever 226 for shifting the arm 258 into and out of contact with the latch 222. Again, the remaining operation of the catch 212 is similar to that described for the two previous forms of the invention.

If desired, an open-ended box-like shroud 64 may be attached to the base 14 of the trap in an overlying manner for purposes of providing a decorative cover for the trap, as well as to conceal the animal once it has been trapped. It is contemplated that the shroud 64 would be furnished in different decors appropriate for use in various locations throughout a house or the like. In this connection it is contemplated that a trap having a safety catch as herein disclosed would be manufactured and assembled in a pre-baited and set packaged condition, including the shroud, in order that the consumer need only shift the safety catch out of contact with the latch when placing the trap. Upon subsequent trapping of an animal the user merely disposes of the entire trap with the animal concealed by the shroud.

Having thus described the invention, what is claimed as new and desired to be secured by Letters Patent is:

1. A safety catch for an animal trap of the kind having a base, a spring-loaded jaw swingable from an open position to a closed position, a pivotable bait-retaining treadle, and an elongated, shiftable latch engageable with the jaw and the treadle in a manner to releasably maintain the jaw in said open position and adapted to release said jaw for swinging to said closed position when said treadle is pivoted, said catch being comprised of:

a selectively shiftable member mounted on said base for movement into and out of contact with said latch when the jaw is maintained in said open position by said latch; and a notch provided in said member adapted to receive and seat said latch when the member is in said contact with the latch, said member being disposed adjacent to said latch to bias an end thereof against said treadle when said member is shifted into said contact and said notch receives and seats said latch, said member and said treadle thereby cooperating to clamp and stabilize said latch in a fixed, inoperative condition relative to said treadle, said member being rotatable about an upright axis, said shifting of said notch occurring as said member is rotated, said member including an elongated upper extension offset from said axis of rotation, said extension having a semicircular, transverse, cross-section and an arcuate vertical surface concentric with said axis, said notch being horizontally disposed in said surface.

2. A catch as claimed in claim 1, wherein said extension further presents a planar, upright wall opposite said arcuate surface, said notch presenting an elongated channel terminating at said wall, said channel having flared end portions as said wall is approached.

3. A catch as claimed in claim 2, wherein said channel is of a greater depth at said flared portions, said extension and said channel defining a cam body engageable with said latch to bias the same in the direction of said abutment as the member is rotated into contact with said latch.

4. A safety catch for an animal trap of the kind having a base, a spring-loaded jaw swingable from an open position to a closed position, a pivotable bait-retaining treadle, and an elongated, shiftable latch engageable with the jaw and having a free end for engagement with the treadle in a manner to releasably maintain the jaw in said open position and adapted to release said jaw for swinging to said closed position when said treadle is pivoted and said free end is out of engagement with the treadle, said catch being comprised of:

a selectively and manually siftable member mounted on said base and remote from said jaw for lateral movement, transversely of said base, into and out of contact with said latch when the jaw is maintained in said open position by said latch; and a laterally open notch provided in said member adapted to receive and seat said latch when the member is in said contact with the latch, said treadle presenting an abutment proximal said free end of said latch and laterally adjacent thereto, said abutment, said latch and said notch being disposed on a substantially common horizontal plane with said notch being shiftable in a lateral, substantially linear direction along said plane as the member comes into contact with said latch, said member being disposed adjacent to said latch to laterally bias and clamp said free end against said abutment when said member is manually shifted into said contact and said notch receives and seats said latch whereby said member and said treadle cooperate to clamp and stabilize said latch in a fixed, inoperative condition relative to said treadle until such time as said member is manually shifted to be out of contact with said latch, said member being in the form of a slidably reciprocable bracket having an upright arm containing said notch, said arm and said notch being in a position to contact said latch when the bracket is shifted in a lateral direction.

5. A catch as claimed in claim 4, wherein said bracket further includes a horizontally disposed, longitudinally arcuate slide in frictional engagement with said base for supporting said arm and means for slidably attaching said length to said base.

* * * * *